Sept. 1, 1925.
J. A. REILLY
1,551,972
VEHICLE CURTAIN LIGHT FRAME
Filed Feb. 29, 1924
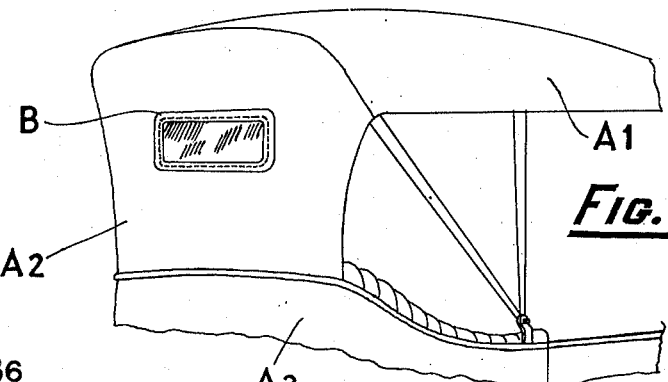
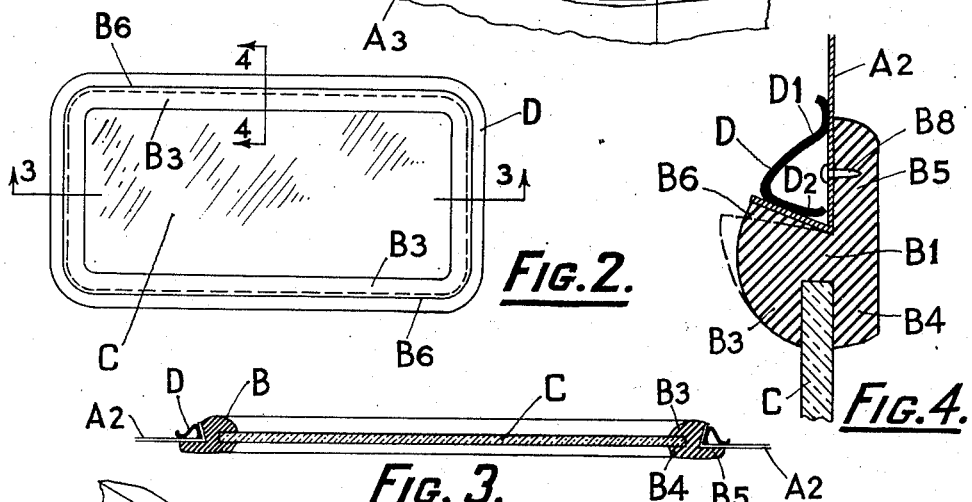
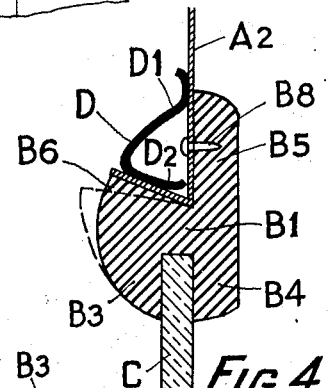
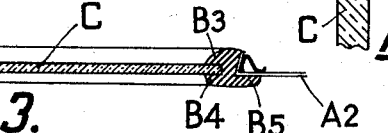
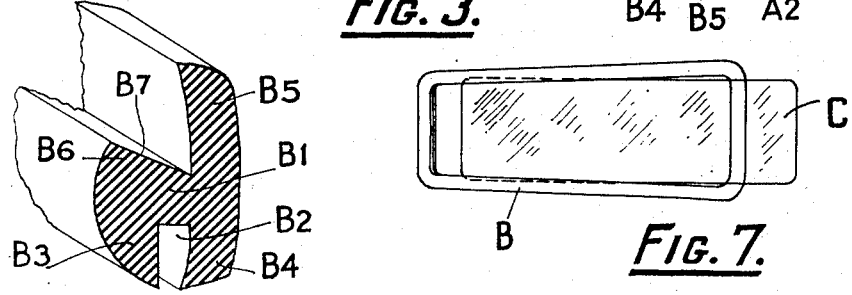
WITNESSES
John W. Burkhalter
H. Gordon Miller
JAMES A. REILLY   INVENTOR.
BY Louis Illmer
ATTORNEY.

Patented Sept. 1, 1925.

1,551,972

UNITED STATES PATENT OFFICE.

JAMES A. REILLY, OF DETROIT, MICHIGAN.

VEHICLE CURTAIN LIGHT FRAME.

Application filed February 29, 1924. Serial No. 695,937.

*To all whom it may concern:*

Be it known that I, JAMES A. REILLY, a citizen of the United States, and a resident of Detroit, in the county of Wayne and the State of Michigan, have invented certain new and useful Improvements in Vehicle Curtain Light Frames, of which the following is a specification.

My invention relates to a window frame and more particularly pertains to a window or light adapted to fit into an opening formed through a side or rear curtain as applied to automobiles or other types of vehicles.

The object of this invention is to simplify and reduce the cost of frame manufacture, also to facilitate the convenient mounting and trimming of a water-tight joint for the window pane with respect to the curtain fabric.

An improved type of structure is used for this purpose comprising a frame member, preferably made of suitably vulcanized rubber, and this frame is provided with an internally disposed grooved or bifurcated socket element adapted to slip over and center therein, a pane of glass or other transparent material. The outer marginal portion of said frame is equipt with an externally disposed flange and a resilient lip means disposed to form an endless furrow with respect to said flange. The furrow circumscribes the pane and is adapted to mount a metallic retaining ring member for the purpose of reenforcing the composition frame structure. This ring is made to snap over the frame lip and further serves to bind the inner marginal edges of the fabric opening.

In carrying out my invention, the frame element is preferably made of rubber of such composition and vulcanization as to impart the desired rigidity to such material and yet provide for sufficient resiliency and flexibility to allow of readily forcing the frame over the edges of the transparent pane and at the same time give the pane mounting ample cushioning effect against shock. The assembled frame and ring members are entirely free from projecting parts and when mounted upon the fabric, each side of the curtain is neatly trimmed.

Embodied herein are also other features of structure and organization designed to facilitate the manufacture and application of said frame to flexible curtains, all of which will be set forth in detail hereinafter.

Reference is had to the accompanying one sheet drawing which illustrates an example of the preferred form of my invention; like characters of reference indicate like parts in the several views, and in which drawing:

Fig. 1, represents a perspective view of a vehicle top structure equipt with my improved frame device which in this instance is shown as applied to a rear curtain light.

Fig. 2, is an elevational view showing the frame member and ring assembled thereon as seen from the interior of the vehicle top.

Fig. 3, is a cross-sectional view of the assembled frame and curtain parts as taken along the line 3—3 of Fig. 2.

Fig. 4, is an enlarged transverse detail of construction taken along the line 4—4 of Fig. 2, and showing the relative position of the various members after assembling the frame upon the curtain fabric.

Fig. 5, is an enlarged cross-section detail of the rubber frame member similar to Fig. 4, but showing the relation and shape of the vulcanized rubber frame structure prior to assembling same upon the glass pane and the curtain fabric.

Fig. 6, represents a partial perspective view of a section of a retaining ring.

Fig. 7, indicates the manner of inserting the glass pane into the bifurcated socket element of my curtain frame member.

Referring first to Fig. 1, the letter $A_1$ represents a deck or top structure of an automobile or similar vehicle, having a rear curtain $A_2$ which comprises a flexible fabric extending in the conventional manner from the deck to the trim line of the tonneau $A_3$. The curtain fabric $A_2$ is cut to provide an opening of about the same dimension as the contour of the inserted curtain light frame, which frame is designated in its entirety as B. The composition frame member of my improved device is preferably moulded or extruded in a cross-sectional shape shown in Fig. 5. This type of frame section is then made to conform to any desired shape and adapted to serve as a continuous binding strip or moulding for the pane contour as indicated in Fig. 2.

This rubber-like binding strip comprises a body part $B_1$ whose inner edge is preferably provided with an endless groove or socket element $B_2$ lying between the integrally disposed or bifurcated flanges $B_3$ and $B_4$, which groove is endless and is intended to extend completely around the pane contour. Furthermore, integrally formed with said body part $B_1$, is an externally disposed flange $B_5$ which similarly circumscribes the frame body and lies in substantial alignment with the plane of the pane C. The rearward or exposed face of the flange $B_5$ is preferably disposed to fall into alignment with the corresponding face of the internal flange $B_4$, and such common flat face is mounted toward the outer or exposed side of the rear curtain $A_2$ as seen in Fig. 1.

The method of mounting the transparent pane C within the circumscribing groove $B_2$ is indicated by Fig. 7. The pane may be slipped lengthwise into said groove as shown, and after the pane abuts against one of the short ends of the frame members, the opposite short end thereof is sprung over the extending portion of the pane and into frame groove so as to constitute a binder strip circumscribing the pane. It is preferred to mould or otherwise form the transverse frame section in the manner indicated in Fig. 5 with the bifurcated internal flanges $B_3$ and $B_4$ sprung inwardly somewhat to better grip and snugly encase the side faces of the pane of glass for the purpose of making a water-tight joint therewith.

As further illustrated in Figs. 4 and 5, the frame structure is also equipt with an outwardly projecting lip member $B_6$ which likewise circumscribes the body part $B_1$. Said lip is preferably beveled with respect to the inner or concealed face of the external flange $B_5$, so that the sloping contour wall $B_7$ makes an acute angle with respect to said adjacent flange $B_5$ and forms a furrow therebetween. The apex of said acute angle lies closer to the bottom of the groove $B_2$ than does the raised outermost edge of said outwardly inclined contour wall $B_7$. By virtue of the resilient material used in said frame structure B, the lip portion $B_6$ may readily be squeezed inwardly or sprung down into its flush position with respect to said apex as indicated by dotted lines in Fig. 4. The purpose of this resilient beveled lip $B_6$ is to permit springing over same and into said furrow, the retaining ring designated in its entirety as D.

As indicated in partial perspective by Fig. 6, said ring is preferably made of sheet metal having a cross-sectionally dished or channel shape adapted to impart ample rigidity and allow it to snap snugly into the furrow as shown in Fig. 4. This style of retaining ring is then fashioned into a closed annular member, and as illustrated in Fig. 2, is intended to circumscribe the entire frame body. The inner edge or leg $D_2$ of said ring section is made to bear snugly along the sloped face of the beveled wall $B_7$ whenever the lip member $B_6$ is fully released into its raised or normal position. The end of the outer edge or leg $D_1$ of said ring is provided with a rounded endless bead-like part which abuts against the adjacent end portion of the external flange $B_5$ with the curtain fabric $A_2$ interposed therebetween as shown in Fig. 4.

The particular contour given to the outer leg end $D_1$ is immaterial, but it is preferred to have this conform to the rounded outline of the internal flange $B_3$ as shown, so as to impart a neat and finished appearance to the inner curtain trim. It is also pointed out that the dimensions and design of the retaining ring D is to be such as to make it sufficiently strong and stiff in structure to provide for a substantial re-enforcement and increased lateral stiffness to the circumscribed composition frame parts designated as B. It will be obvious that said ring may be made solid if so desired and of any material suitable for the described purpose.

Referring now to the trimming of my frame, it will be seen that the inner edge of the opening cut into the curtain fabric $A_2$ is mounted alongside the concealed face of the external frame flange $B_5$. The fabric is suitably slit at the corners of the opening therein so as to allow the flaps thus formed to be readily turned up and made to lie snugly against the beveled lip face $B_7$. The fabric together with said flaps are then cemented or otherwise secured to the adjacent faces of the frame B so as to virtually become a part thereof. It is intended that the fabric be smoothly fitted without wrinkles into the acute angle of the furrow formed between the elements $B_5$ and $B_7$.

Thereupon, and with the pane C mounted within the groove $B_2$ as described, the retaining ring D is sprung into place as shown in Figs. 2 and 4, the end of inner ring leg $D_2$ being slightly rounded to facilitate this operation. The required depression of the lip $B_6$ may be accomplished by the use of a suitable tool adapted to work the ring into said lip apex piecemeal, until the entire ring is made to slip into its proper place. The sheet metal ring will then embrace the inner marginal edge or flap of the fabric opening and serve to confine and reenforce the rubber-like frame member B against any lateral pull or whip on part of the curtain fabric $A_2$. If so desired, said fabric $A_2$ may be further secured to the external flange $B_5$ by means of suitably spaced tacks or like supplementary means adapted to reenforce the grip of the fabric to the frame member B.

It will be obvious that the cross-sectional shape of this frame member may be varied to suit requirements and that the contour of the frame outline surrounding the pane, may be of any shape desired. The cushioned resilient mounting of the pane readily absorbs any vibration or jolts to which it may be subjected while in service, all without breakage of the pane or excessive strain upon the curtain fabric. By reason of my improved frame structure, the fabric together with its transparent pane are not only tightly gripped by the frame, but the outwardly rounded leg end $D_1$ of the retaining ring provides against having the fabric tear or break at the outermost line of its attachment to frame.

Furthermore, the need for prongs, screws or the like fastening devices between the frame members are eliminated, and convenient means are provided for replacement of the pane in case of accidental breakage thereof. The constructive features of my improved frame are of such character that it can readily and economically be applied to a curtain fabric at the minimum of trimming expense, and since the frame parts are light in weight, they produce no abnormal strain upon the curtain fabric when subjected to severe whipping action.

It will be understood that the design of the described frame parts may readily be modified without departing from the spirit and scope of my invention, heretofore described and more particularly set forth in the appended claims.

Claims—

1. In a curtain frame comprising a rubber-like member provided with an internal socket element, a transparent pane mounted in said socket, a resilient lip means for said frame member, and an endless retaining ring sprung over said lip to reenforce said frame member with respect to the pane.

2. In a curtain frame comprising a rubber-like member and an internally disposed bifurcated flange therefor constituting a socket element, said frame member being further provided with a furrow adapted to circumscribe the pane and of which furrow a wall portion serves as a resilient lip means, a transparent pane mounted in said socket, and an endless retaining ring sprung over said lip and into said furrow.

3. In a curtain frame comprising a rubber-like member provided with an internal socket element, a transparent pane mounted in said socket, an external flange for said frame member in substantial alignment with the sides of said pane, a resilient lip means integral with said flange having a contour wall constituting a portion of a furrow circumscribing said pane, said lip wall being so disposed that a plane taken cross-sectionally thereof forms an acute angle with respect to the adjacent face of said flange, and a retaining ring sprung over the outermost edge of said contour wall and into said furrow.

4. In a curtain frame having a bifurcated flange internally disposed to form an internal socket element, a transparent pane mounted within said socket, a retaining member serving to embrace said frame member, and a resilient lip means constituting one wall of a furrow for the frame, said lip being adapted to be depressed inwardly toward the pane for the purpose of allowing said ring to be sprung over said lip and into the furrow.

5. In a curtain frame having an internally disposed socket element, a transparent pane mounted within said socket, an externally disposed flange formed integrally with said frame, a fabric having a hole therethrough with the inner edge thereof secured to said flange, a resilient lip means for said frame also circumscribing the pane forming a furrow with respect to said flange and a retaining number sprung over said lip into said furrow and serving to trim said inner edge of the fabric.

6. In a curtain frame having an internally disposed socket element, a transparent pane mounted within said socket, an externally disposed flange formed integral with said frame, a resilient lip means for said frame, said lip constituting one side wall of a furrow surrounding the pane, a fabric having a hole therethrough with the flap edges thereof disposed in said furrow, and a retaining ring sprung over said lip into said furrow and serving to grip said fabric flaps.

7. In a curtain frame having an internally disposed socket element, a transparent pane mounted within said socket, an externally disposed flange for said frame, a resilient lip means for said frame disposed to form a furrow with respect to said flange, a fabric having a hole therethrough with flap edges thereof cemented to a wall portion of said furrow, supplemental fastening means for reenforcing the bond between said furrow and the fabric, and a retaining ring sprung over said lip and into said furrow.

8. In a curtain frame having an internal socket element, a transparent pane mounted within said socket, an externally disposed flange circumscribing the pane, a resilient lip means for said frame disposed to form a furrow with respect to said flange, and a sheet metal retaining ring sprung over said lip and into the furrow, said ring having one longitudinal edge thereof adapted to bear against said lip and the other leg against said flange.

9. In a curtain light comprising a resilient frame provided with an internally disposed socket element, a transparent pane mounted within said socket, an external flange for the frame, said frame provided with a resilient lip means, a fabric having an opening therethrough of which the inner marginal edge makes a joint with said lip, and a retaining member adapted to snap over said lip and grip said fabric inwardly toward the edge of the pane.

10. In a curtain light comprising a transparent pane and a rubber-like frame adapted to snap over the edge of the pane, an integral resilient lip means for the frame including an inclined contour wall, and a retaining member adapted to snap over and grip said lip to reenforce the frame against distortion.

11. In a curtain light comprising a transparent pane and a frame provided with an internally disposed socket element adapted to be sprung over the edge of the pane, a retaining member adapted to reenforce the frame member against distortion, and a resilient lip means for the frame cooperating with the retaining member, said lip being adapted to be depressed toward the edge of the pane and when released, serving to grip in under the retaining member.

12. In a curtain light frame assembly comprising a transparent pane and a resilient frame member equipt with an internally disposed socket element adapted to be sprung over the edge of the pane, said frame further comprising a resilient lip means including a contour wall adapted to be depressed toward the edge of the pane after the frame has been sprung in place about the pane, a fabric having an opening therethrough of which its inner marginal edge is disposed along said contour wall, and a retaining member adapted to grip said lip and retain the fabric therebetween.

In testimony whereof, I have herewith set my hand this 25th day of February, 1924.

JAMES A. REILLY.